(12) United States Patent
Barrs et al.

(10) Patent No.: US 6,988,694 B2
(45) Date of Patent: Jan. 24, 2006

(54) PUSH RELEASE LOOP

(75) Inventors: Christopher Carswell Barrs, Haiku, HI (US); Donald Lewis Montague, Haiku, HI (US); Alexander Pouchkarev, San Anselmo, CA (US)

(73) Assignee: Nalu Kai Incorporated, Haiku, HI (US)

( * ) Notice: Subject to any disclaimer, the term of this patent is extended or adjusted under 35 U.S.C. 154(b) by 310 days.

(21) Appl. No.: 10/432,466

(22) PCT Filed: May 14, 2003

(86) PCT No.: PCT/US03/15433

§ 371 (c)(1),
(2), (4) Date: May 14, 2003

(87) PCT Pub. No.: WO03/095033

PCT Pub. Date: Nov. 20, 2003

(65) Prior Publication Data

US 2004/0140393 A1 Jul. 22, 2004

Related U.S. Application Data

(60) Provisional application No. 60/380,777, filed on May 14, 2002.

(51) Int. Cl.
*B64C 31/06* (2006.01)

(52) U.S. Cl. ............................. 244/155 A; 114/39.18
(58) Field of Classification Search . 244/153 R–155 A; 294/82.32, 82.34; 114/39.18, 102.11, 39.16; 403/212, DIG. 4, 409.1; 24/598.5, 600.6, 24/128, 115 R, 115 A, 115 K, 115 H; 59/85, 59/88, 93

See application file for complete search history.

(56) References Cited

U.S. PATENT DOCUMENTS

| | | | | |
|---|---|---|---|---|
| 6,513,759 B2 | * | 2/2003 | Starbuck | 244/155 A |
| 6,581,879 B2 | * | 6/2003 | Bellacera | 244/155 A |
| 6,691,954 B1 | * | 2/2004 | Harrington et al. | 244/155 A |
| 6,745,713 B2 | * | 6/2004 | Starbuck | 114/39.16 |

* cited by examiner

*Primary Examiner*—Galen Barefoot
(74) *Attorney, Agent, or Firm*—Martin E. Hsia

(57) ABSTRACT

The invention is a device that push releasably retains one end of a rope (111) abutting against an intermediate part of the rope (103) to form a push releasable loop.

13 Claims, 18 Drawing Sheets

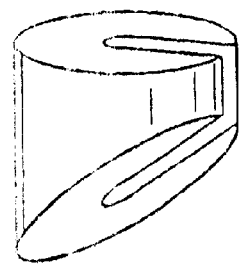
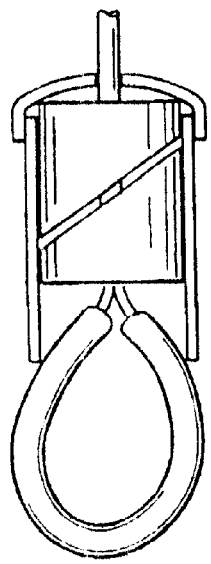
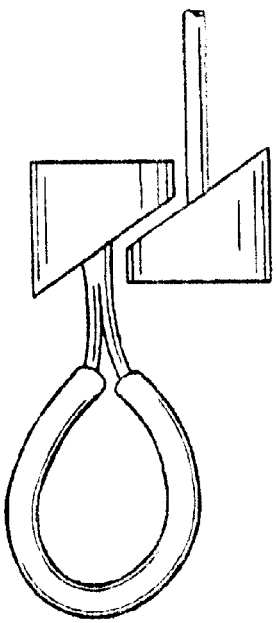
Fig.18A
Fig.18B
Fig.18C

PUSH RELEASE LOOP

This application claims the benefit of Provisional Application No. 60/380,777, filed May 14, 2002.

TECHNICAL FIELD

Kitesurfing is a recreational activity in which the user employs a large kite to harness the wind in order to pull him/herself across the surface of the water/snow while riding on a board or other device. It is fair to think of this sport as basically water skiing behind a powerful kite, although this sport has been adapted to be used on snow/ice as well. The most popular type of kite is the inflatable kite. The kite structure consists of a framework of inflated tubes that give the kite its structure (See FIG. 1). A canopy skin is then attached to the inflated structure. This structure allows the kite to relaunch off of the water's surface, and maintains the proper shape of the kite in the air. Ram air kites are the other type of kite and are similar to the rectangular parachutes that employ a series of cells filled with air (not under high pressure) as a structure, and an intricate bridle system comprising of many lines. Ram air kites typically have a flat shape, and the inflatable kites have a distinctive "C" shape in the air. This invention can be applied equally well to both types of kites.

FIG. 1 shows the general relationship between the inflated kite, the flying lines, and the control bar to a conventional "quick release" loop. Referring to FIG. 1, the kite skin 50 is supported by an inflated framework of tubes. The leading edge tube 53 and the strut tubes 51 are inflated with air to support the kite and to aid in relaunching the kite from the water.

When participating in the sport of kitesurfing, the user typically wears a harness fitted with a spreader bar. The spreader bar generally consists of a metal bar that spans the width of the user's hips. The middle of this bar has a hook on it, preferably with the opening facing downwardly. The harness is worn around the user's midsection, and its purpose is to retain a loop 67 that is connected to the kite. The user engages this loop into the hook on the spreader bar. The kite's pull is transferred through the loop into the spreader bar and then on to the user. Basically, the user is being pulled around by the loop 67.

The kite typically has four flying lines. The front lines 55 are the ones that transmit the vast majority of the kite's pull. The back lines 57 are connected to the ends of the control bar 63 and are used for steering and power control. The front two lines are tied to the top end of an adjuster strap 59, which typically has a buckle 61 which provides for the length adjustment of the front lines. The bottom end of the adjuster strap attaches to a rope 65 called a trim line. Of course, the terms "rope" and "line" refer to ropes, straps and other equivalent structures that perform the same functions. The trim line goes through a hole in the center of the control bar.

The other end of this line creates the loop. While the loop is engaged in the hook on the spreader bar, the user can move the control bar up and down the rope between the loop 67 and the adjuster strap 59. Moving the bar in this manner creates a discrepancy in the length of the front lines with respect to the back lines. This difference in length changes the angle of attack (pitch) of the kite's airfoil, influencing the amount of power generated by the kite. The loop is often referred to as a trim loop because when hooked into the loop, it is possible to change the trim of the kite by moving the control bar up and down the trim line. Push the bar away and less power is generated; pull the bar towards your body and the angle of attack is increased, thus generating more power.

When the hook on the spreader bar retains the loop on the end of the trim line, the user is directly connected to the power of the kite. A vast majority of the kite's pulling force is transferred through the loop and into the spreader bar. If the user employs only the hook and loop as described above, he/she cannot free him/herself from the pull of the kite without removing (unhooking) the loop from the spreader bar on the harness. An inherent problem is that in order to unhook the loop, the user must pull the control bar towards the body until it comes in contact with the loop. The user cannot let the control bar go because the user's hands must remain on the control bar in order to maintain steering control of the kite. When the control bar comes in contact with the loop, the user must then overcome the pulling force of the kite in order to unhook the loop from the spreader bar. Problematically, the movement of the control bar towards the body increases the angle of attack of the airfoil, and generates more power in the kite. If the user desires to disconnect himself from the kite because of impending danger resulting from the kite pulling too much, he/she must generate even more power (and pull against that increased power) to free himself/herself. Depending on the situation and the strength of the person he/she may not posses the arm strength necessary to unhook and disconnect the kite. There have been documented deaths and serious injuries resulting from the inability to unhook and release the loop.

In an emergency situation, the user must both be aware of the kite's position in the sky, and also worry about disconnecting him/herself from the kite. Kiting is often practiced in radical conditions. Novices typically only should kitesurf in light to moderate conditions, but experts have been known to go out in winds in excess of 60 mph. Even in winds of 15–20 mph, the kites used are powerful enough to drag the person into serious trouble. One documented death involved a lady who was lifted up and over a house and killed when impacting a concrete wall on the far side of the house. People have been dragged into roadways, into boats, bridges and into trees because of the inability to disconnect themselves from the pull of their kite. This sport is potentially dangerous because the user can potentially be dragged violently into hard objects or into other people.

BACKGROUND ART

The problems described above can be overcome by a loop that has an easy to find trigger (no hard to find handle), and can reliably disengage the user from the kite while under load by activating a mechanical device. Several prior art quick release loops exist and are documented in the attached drawings. The ideal quick release loop should be reliable, easy to open while under load, quick to deploy, and should not require locating a special handle or trigger to activate the release mechanism. It is also not ideal for the release mechanism to rely on hook and loop fasteners to secure the loop in the closed position. Hook and loop fasteners (widely known as Velcro) are unreliable because of the degradation of effectiveness experienced over time. Often times the hook and loop fasteners are fouled by things like sand, seaweed, fabric threads, hair etc.

It is important to recognize that in order to avoid danger in an emergency situation, one often has less than one second to:

1. Realize that danger is impending; and
2. Activate the quick release mechanism In order to activate the prior art types of quick release loops, one must first locate a special handle, obtain a good grip, and then pull the handle, sometimes with cold, stiff and wet hands, which may be slippery. A big problem of all prior art is that the handle is not always in the same place. Sometimes it is most easily accessed with the right hand, but often it is equally likely to be most accessible with the left hand.

In many prior art devices, the release mechanism can be activated by pulling in various directions. Thus, if snagged on a piece of equipment, the handle may inadvertently get pulled out to the side, or in some cases inwardly, away from the kite, and towards the user.

This problem is further exacerbated by the fact that during normal use of kitesurfing equipment, it is not unusual to lose your board and be dragged (while in control and out of danger) fairly rapidly through the water. The handle will therefore be in the water, and the passing water or objects rushing by the handle would apply a force rearwardly, away from the kite, a direction that potentially could unintentionally activate the quick release mechanism. If the kite were released by an inadvertent opening of the quick release loop, other people could be put in harm's way by a powerful kite that is tumbling downwind, out of control. An optional safety leash can be used to keep the kite tethered to the user after the kite is released, but these systems are presently wrought with problems that cause many people to choose not to employ this type of system.

Referring to FIG. 2, one can see an early form of a quick release loop. This embodiment relies on a "snap shackle" for the opening mechanism. This release mechanism is not ideal because of the non-specific direction of pull necessary to activate the quick release mechanism. Once activated, entire metal snap shackle 70 must then pass through the hook on the spreader bar before the user is free from the pull of the kite. This introduces the possibility of the snap shackle snagging some part of the hook and failing to free the user from the kite.

Referring to FIG. 3, one can see another embodiment of prior art. This version relies on a pin 80 to secure rope 81 by passing the rope through the hole 82.

FIG. 4 shows the embodiment illustrated in FIG. 3 in a further state of assembly. Securing straps 83 and 85 use hook and loop fasteners to keep the pin 80 in place. The special handle 87 must be located and pulled by the user to activate the release mechanism.

FIG. 5 shows the fully assembled quick release trim loop and the arrow 89 indicates the optimal direction of pull on handle 87 to activate the release mechanism.

FIG. 6 illustrates still another embodiment of prior art quick release loop. This version uses the special handle 90 attached to the pin 91 to secure the end of the loop 93. Arrow 95 indicates the only direction of pull that will result in the opening of the loop. This concept does have a limited direction of pull needed to deploy the mechanism, but the handle is not reliably in the same place because, for example, the user may have twisted with respect to the loop.

FIG. 7 shows still another embodiment of a prior art quick release loop. This version uses a length of webbing 303, which is stiffened by a piece of rigid material indicated by the dotted line 302. The piece of webbing 309 and 311 both have hook and loop fastener material on the underside. The stiffened webbing 303 passes through the metal ring 300 and folds back onto itself as indicated by arrow 305.

FIG. 8 shows the loop described in FIG. 7 above further along in its assembly. Part 303 has been folded back onto itself, and part 309 will now pass through the metal ring 300 and attach to the back of part 307 as indicated by arrow 314. The arrow 315 indicates the optimal direction of pull applied to handle 313 needed to activate the quick release mechanism. Again, the special handle is not reliably in the same place.

FIG. 9 shows still another embodiment of prior art quick release loop. This version relies on a pin 333 connected to handle 330 to keep loop 337 attached to the top of the loop 339. The arrow 340 indicates the only direction of pull that can activate the quick release mechanism. Part 341 is a leash that is used to tether the handle to the loop, to prevent losing the handle and pin assembly in the water.

FIG. 10 shows the quick release loop described above after the handle 300 has been pulled. One can see that the two loops 337 and 339 separate from each other. This device produces the end result of the user being free from the pull of the kite, but does it without opening the loop. The loop becomes separate from the rest of the kite. This is not ideal because of the possibility of losing the loop.

It is therefore an object of this invention is to provide for the reliable opening of the loop while under load, thus freeing the user from the pull of the kite.

It is a further object to avoid the need to find a specially located handle in order to operate the mechanical device.

It is a further object for the entire device to be compact in nature, and be substantially rigid so as to facilitate easy hooking and unhooking of the spreader bar.

It is a further object of this invention to have the loop self orient to provide for easy engagement into the hook on the spreader bar.

DISCLOSURE OF INVENTION

The foregoing and other objects are achieved by a retainer that retains a user end of a rope abutting against an intermediate portion of the rope to form a loop, with the retainer slidable along the rope so that pushing the slidable portion along the rope and away from the user releases the user end of the rope from the retainer, so that the loop opens up. Preferably the device is activated ONLY when pushed outwardly towards the kite, so that the device comprises a "push release loop."

Preferably, the retainer comprises a sleeve (having any shaped cross section) mounted on the rope, and the user end of the rope is maintained abutting against the intermediate portion of the rope by a frame mounted on the rope that holds a pivotable pivot pin, and a ring mounted on the user end of the rope that is engageable by the pivot pin. Of course, the frame can be provided by the rope itself, such as by intertwining a rotatable pivot pin in the rope: the term "frame" includes any means for pivotably retaining the pivot pin on the rope. When the ring is engaged with the pivot pin and the pivot pin is pivoted into the closed position, a loop is formed. The retainer then can slide over the pivot pin to maintain it in the closed position. When the retainer is pushed beyond the pivot pin, the pivot pin is released and can pivot to the open position, thus releasing the ring and thereby opening the loop.

Previous designs all have a special handle to find, and the direction of pull necessary for activation is not limited to only the ideal direction. In addition, none of the prior art addresses the need for a self-orienting loop, and many do not remain rigid for easy engagement with the hook.

According to the broadest aspect of the invention, the push release loop provides an easy and reliable deployment mechanism designed to open the loop while under load in a manner in which the end result is the user being quickly and easily released from the pull of the kite, and avoids accidental opening. The direction of motion needed to activate the quick release mechanism is ideally limited to a specific direction, preferably outwardly towards the kite.

The push release loop as embodied in this invention and detailed in the attached illustrations labeled FIG. 11 performs in several novel ways. The push release loop uses a flexible plastic "sleeve" that secures the opening mechanism in the closed position. The flexible nature of this sleeve provides the right amount of resistance when activating the release mechanism. This sleeve must be moved outwardly along the rope (towards the kite or kitewardly) to open the loop and release the kite. This eliminates an external "handle" and eliminates inadvertent deployment resulting from passing water pressure or the handle becoming snagged on other gear. The mechanism also can be activated merely by pushing, which may be much easier than pulling, especially if the user's hands are cold, wet, slippery, or stiff, or if the user is injured. The mechanism ONLY works when pushed outwardly towards the kite, which is a novel and important feature.

The "sleeve" can be any appropriate shape, such as a ring, which is merely a truncated sleeve.

The "sleeve" 107 is equally accessible by both left and right-handed users. It is also reliably in the same place each time it needs to be activated. In order to activate the release mechanism, one only needs to slide a hand down the trim line 105 until the body of the loop is found. Grasping anywhere except for part 111 and pushing outwardly towards the kite will open the loop. This feature facilitates quick deployment of the system, which is critical in an emergency situation. The ambidextrous nature of the "trigger" is an important and novel feature of this invention.

BRIEF DESCRIPTION OF DRAWINGS

FIGS. 18A, 18B and 18C are front cut-away views of a second alternative embodiment of a push releasable loop according to the present invention.

BEST MODES FOR CARRYING OUT INVENTION

Figure 1:
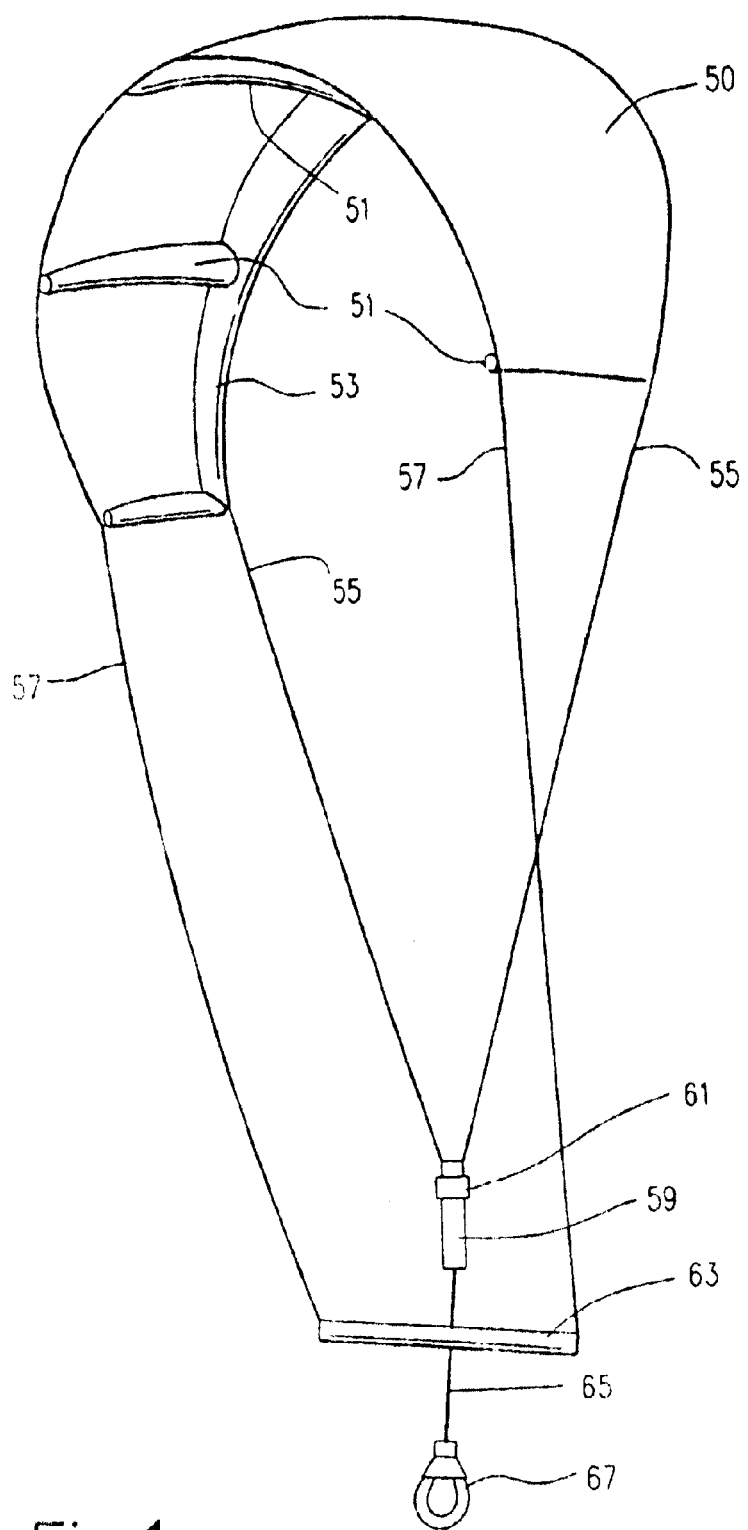
FIG. 1 is a rear perspective view from the right of a conventional kitesurfing kite, showing the inflated kite, flying lines, control bar and quick release loop.
Figure 2:
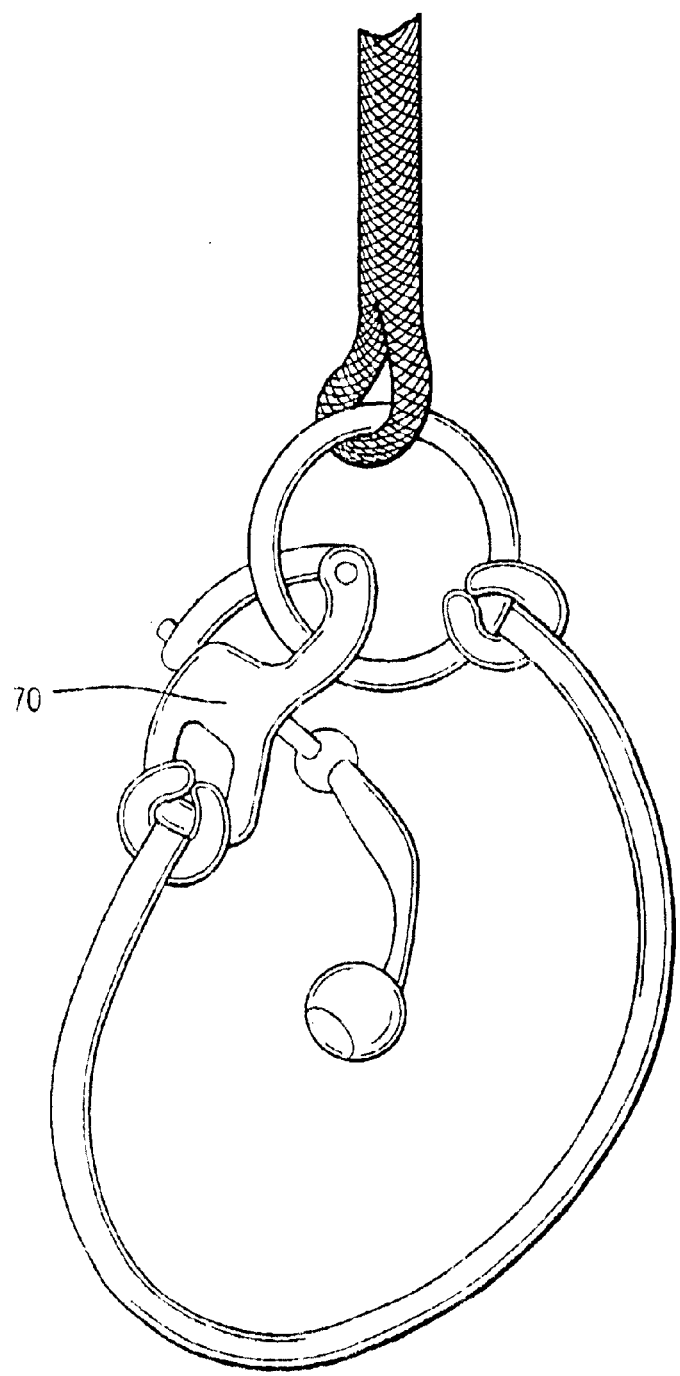
FIG. 2 is a front elevational view of a first type of conventional quick release loop.
Figure 3:
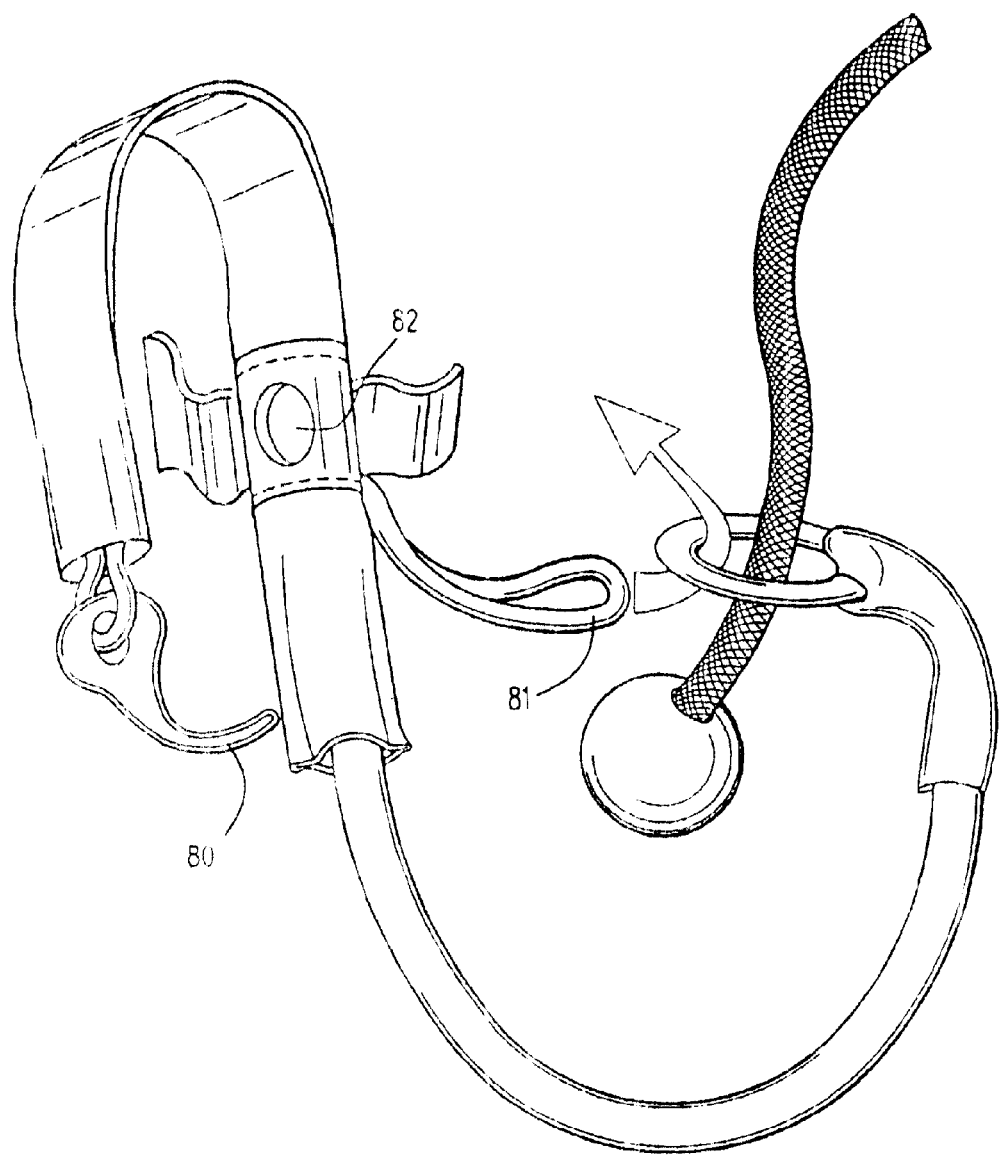
FIG. 3 is a front view of a second type of conventional quick release loop.
Figure 4:
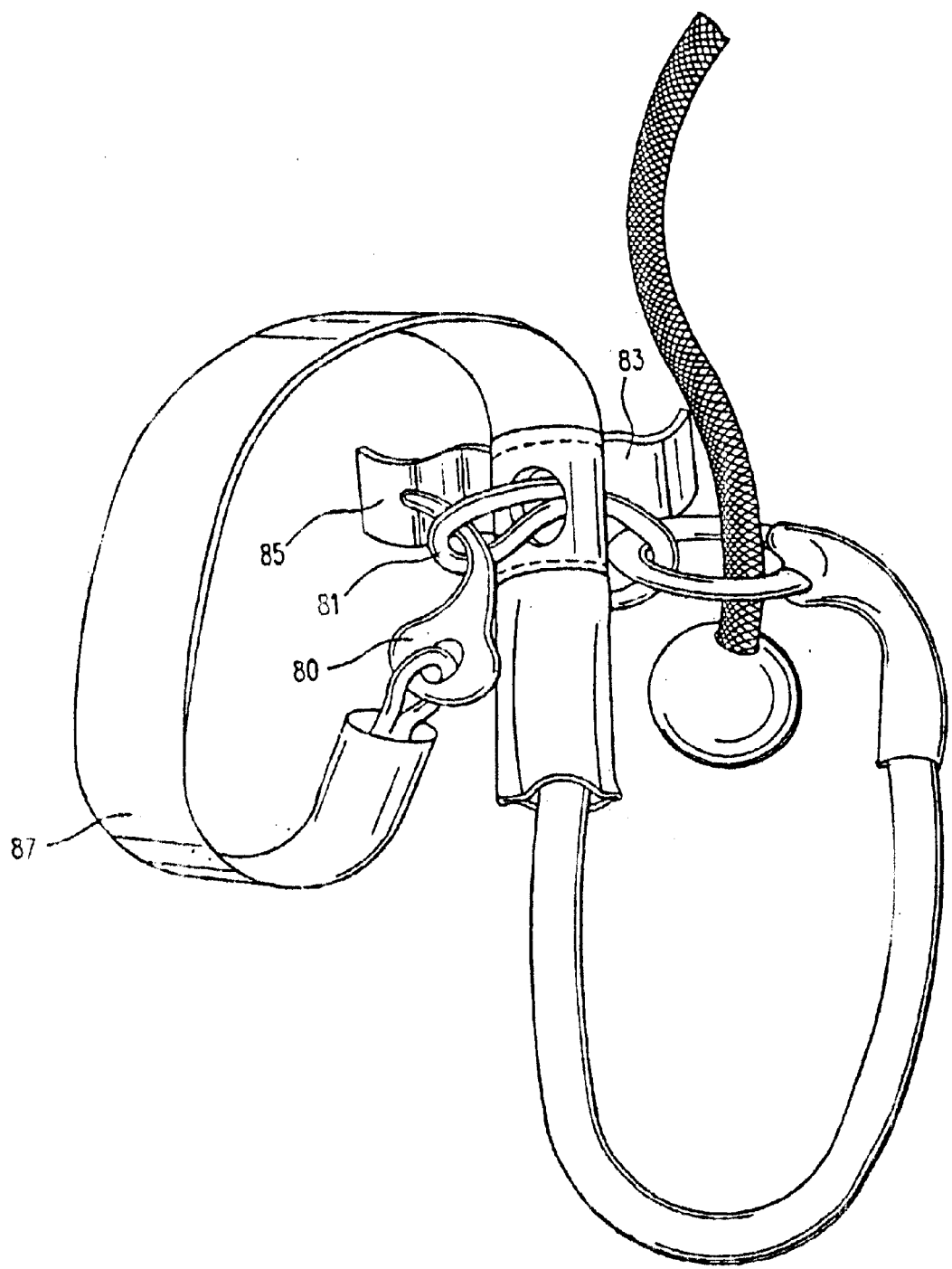
FIG. 4 is a front view of the quick release of FIG. 3 in a partially assembled configuration.
Figure 5:
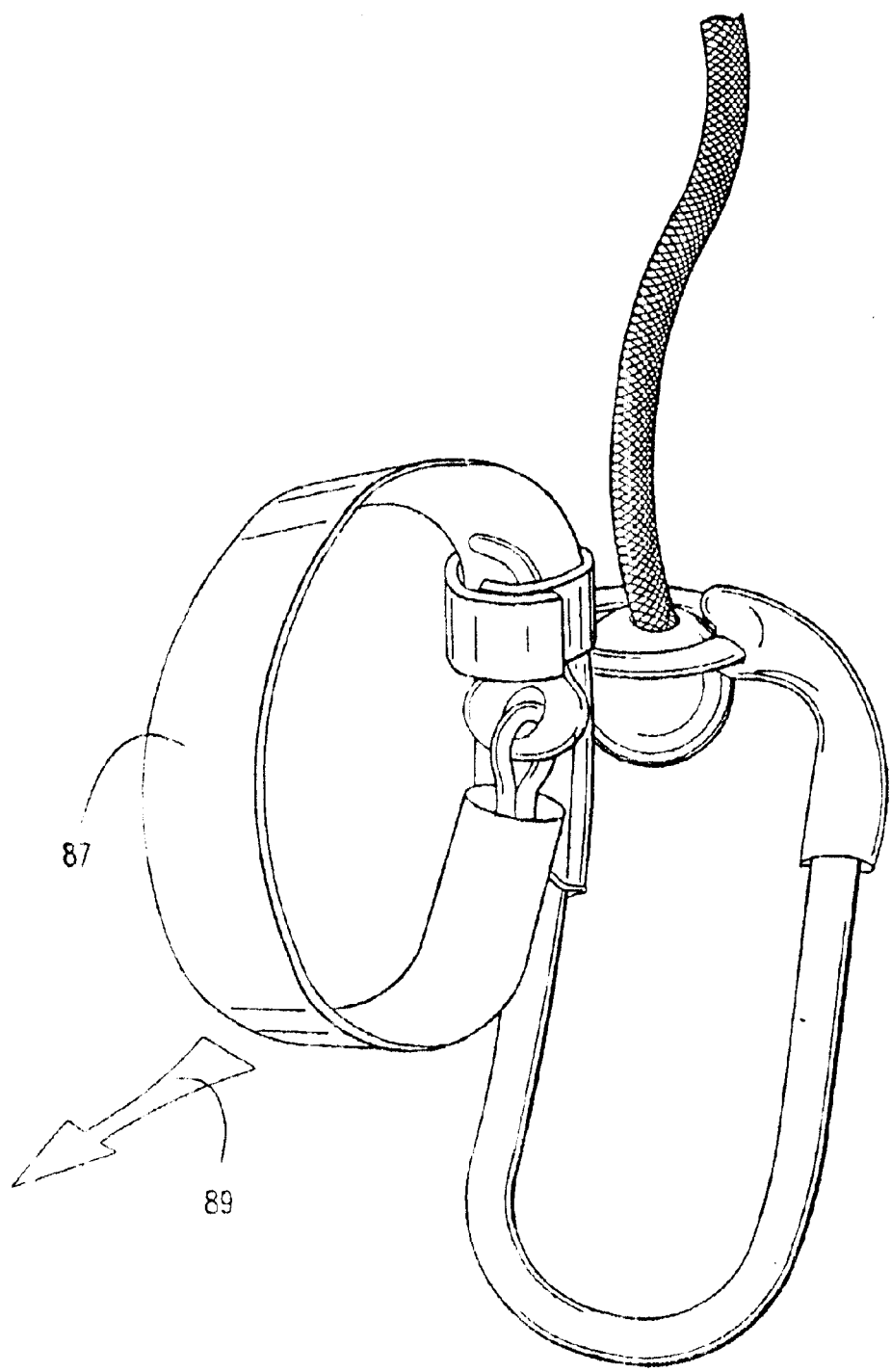
FIG. 5 is a front view of the quick release of FIG. 3 in the fully assembled configuration.
Figure 6:
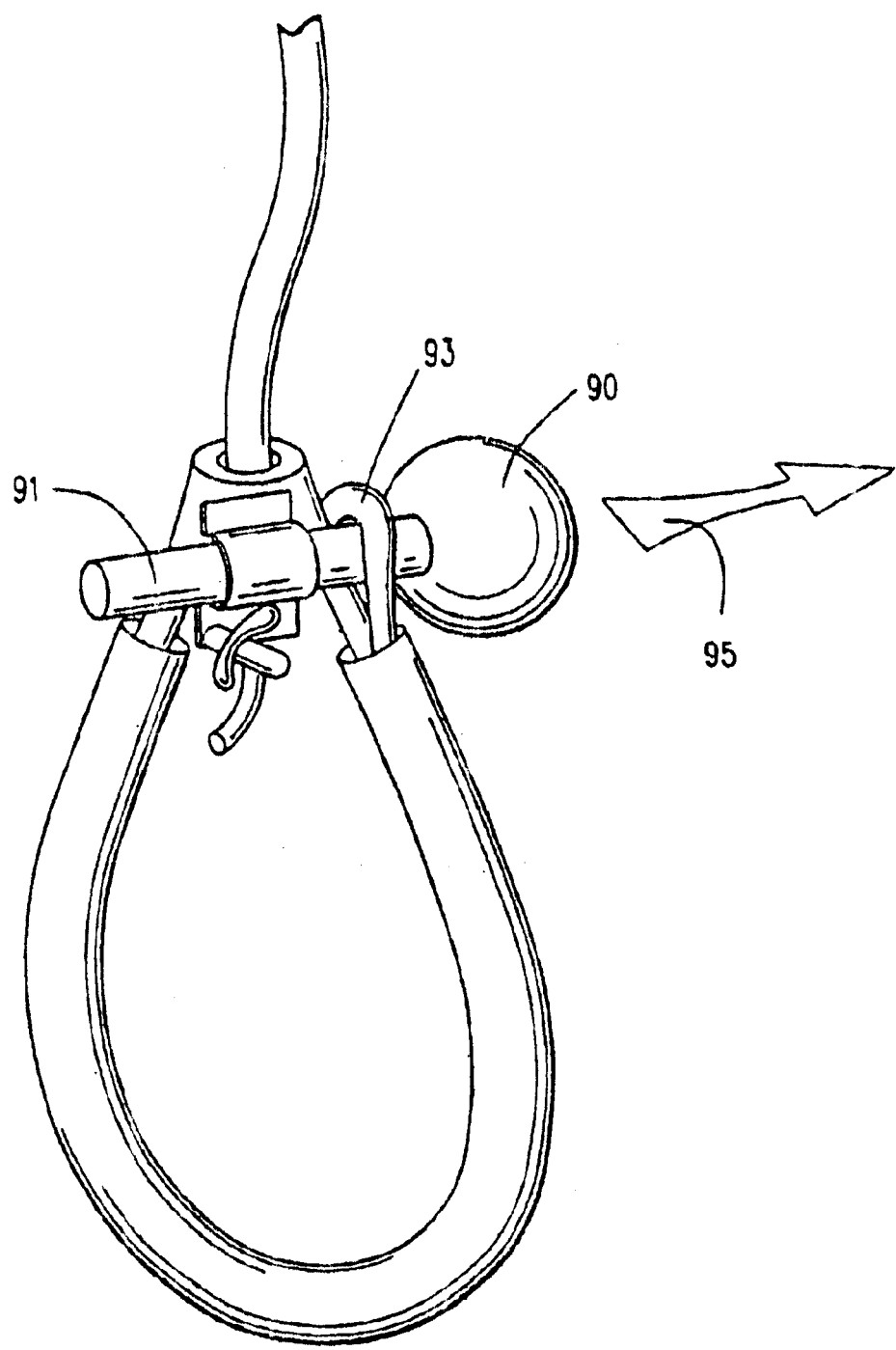
FIG. 6 is a front view of a third type of conventional quick release loop.
Figure 7:
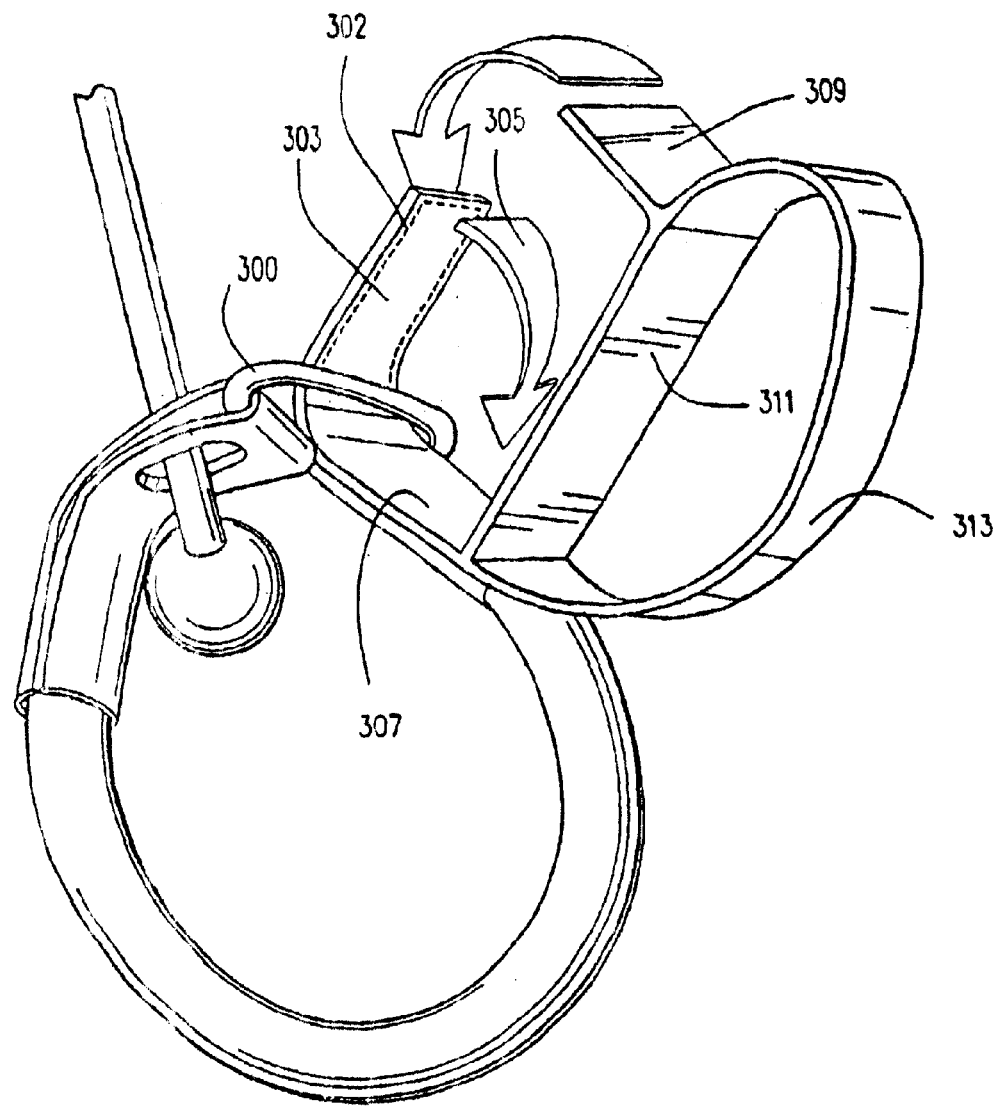
FIG. 7 is a front view of a fourth type of conventional quick release loop in a partially assembled configuration.
Figure 8:
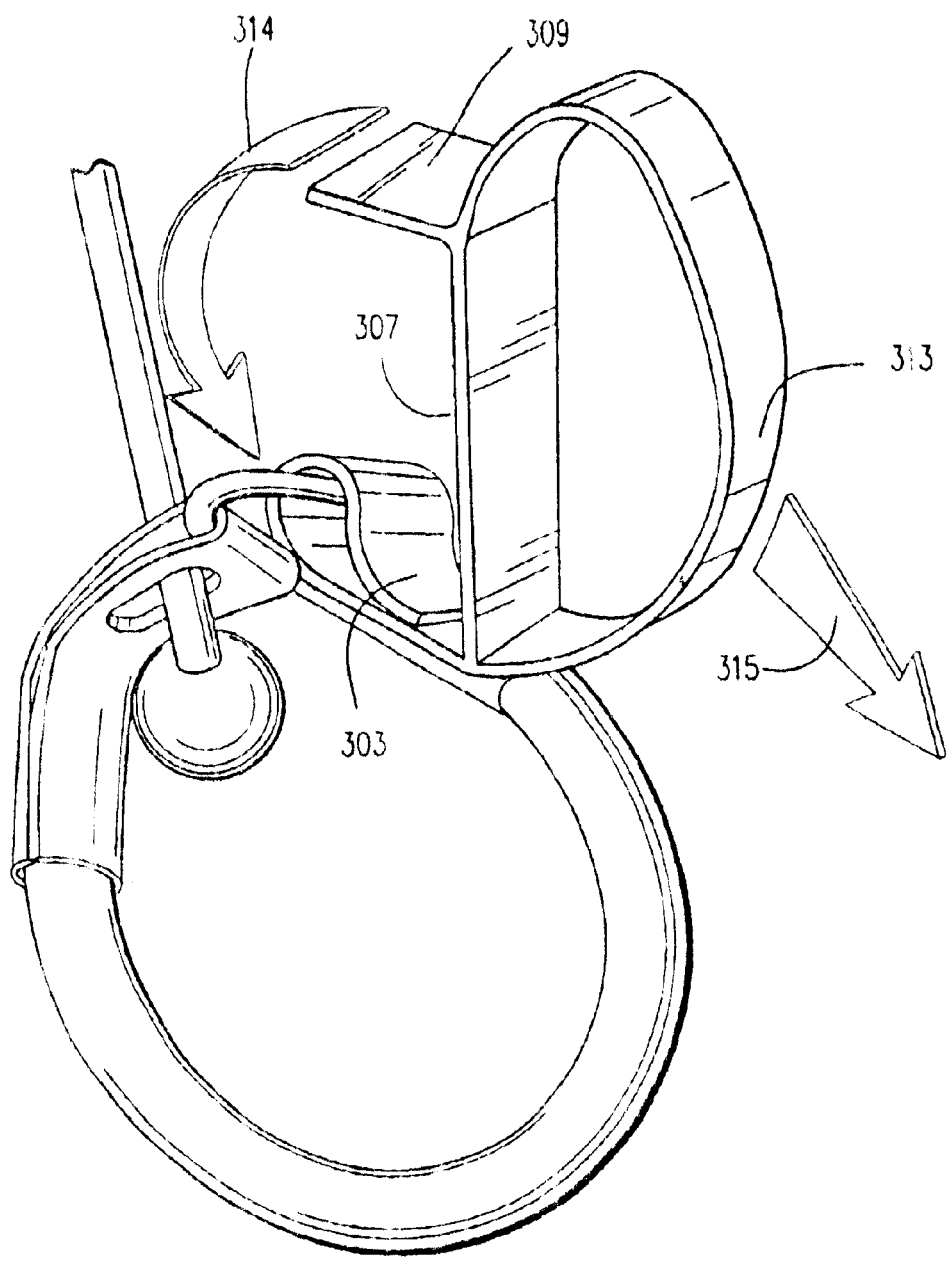
FIG. 8 is a front view of the quick release loop of FIG. 7 in a mostly assembled configuration.
Figure 9:
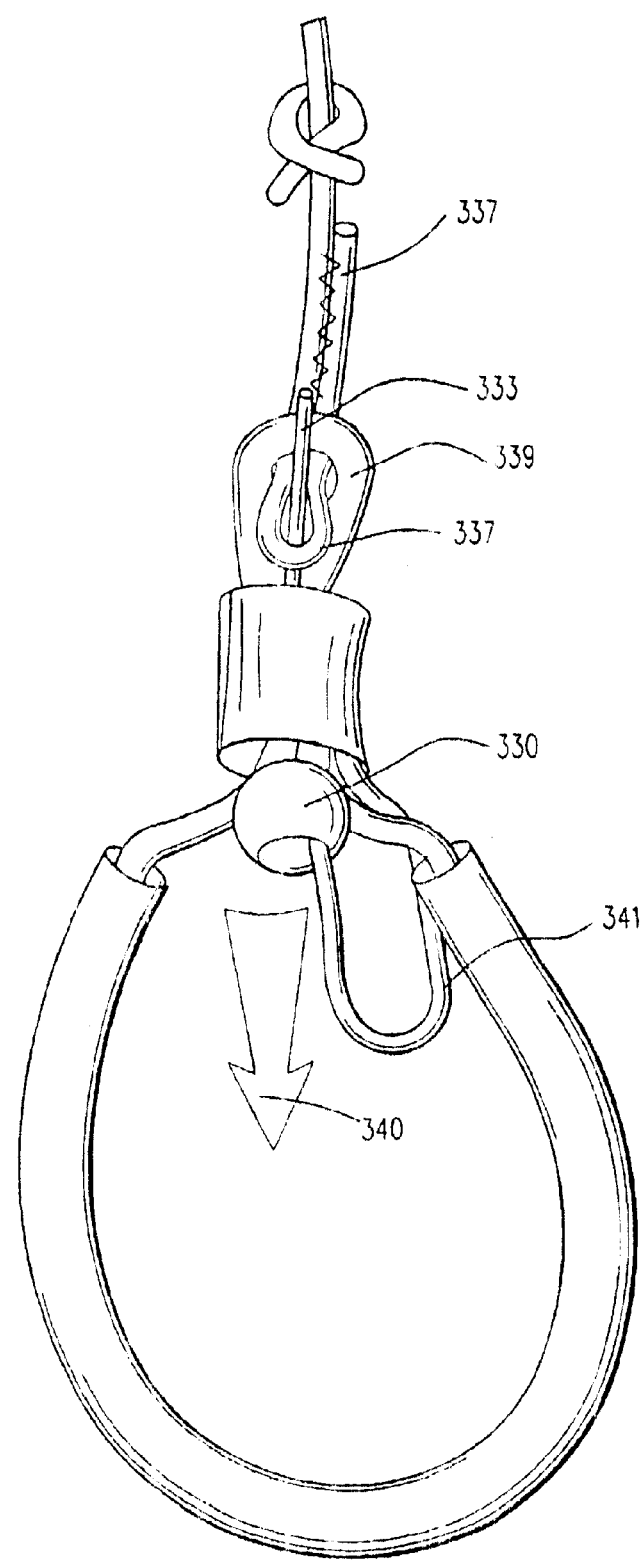
FIG. 9 is an front view of a fifth type of conventional quick release loop in an assembled configuration.
Figure 10:
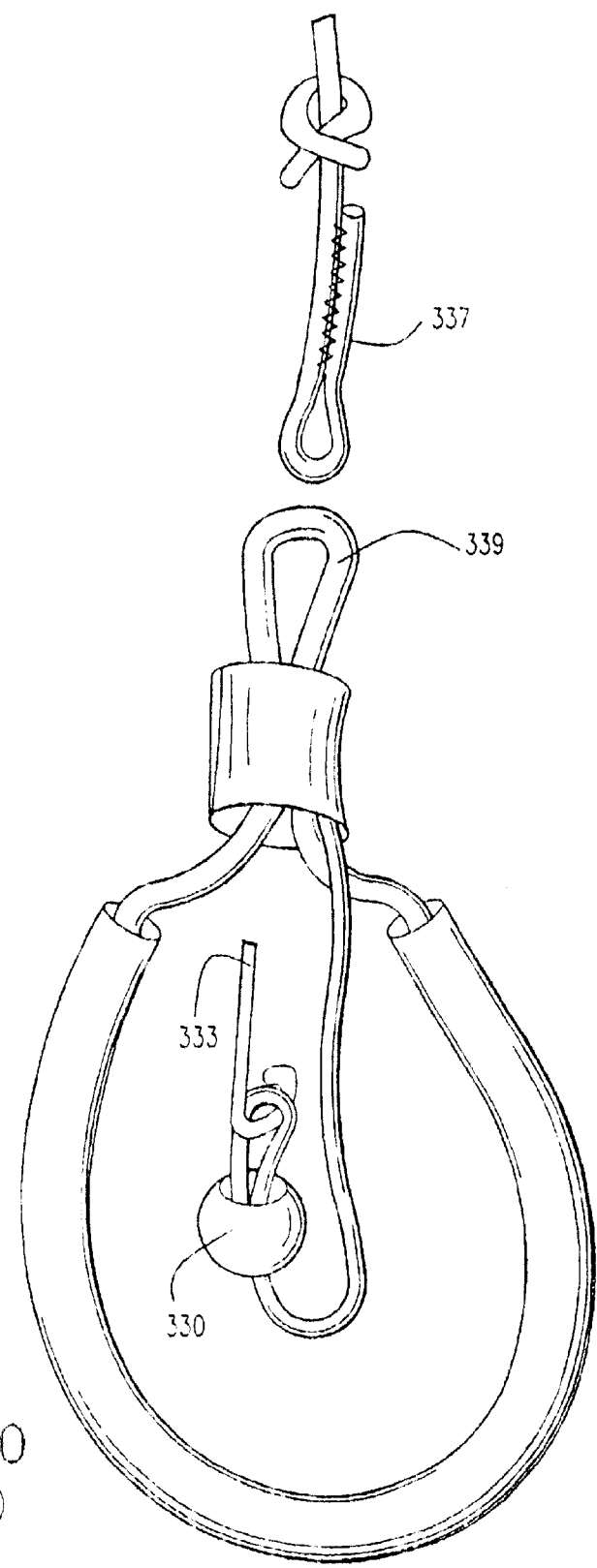
FIG. 10 is a front view of the quick release loop of FIG. 9 as it is being released.
Figure 11:
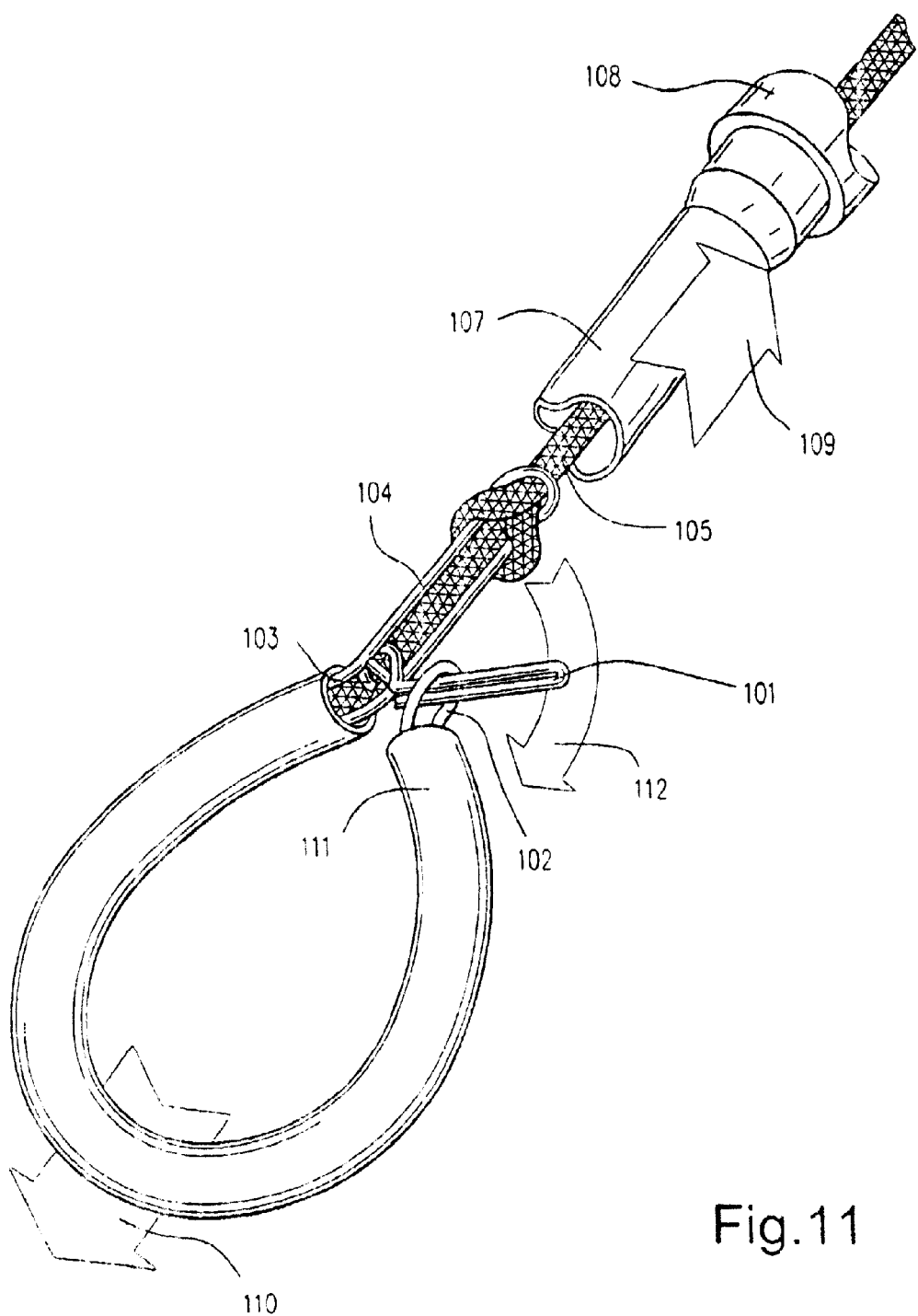
FIG. 11 is a perspective view from the left of a first preferred embodiment of the push release loop according to the present invention.

The invention is a device that push releasably retains a user end of a rope abutting against an intermediate part of the rope to form a push releasable loop. Referring to FIG. 11, a frame 104, preferably metal, is attached to an intermediate portion of the rope (preferably by intertwining) and provides a pivot point 103 for the pivot pin 101 to pivot about. The retainer 107 has a cross section larger than the cross section of the frame 104 and the pivot pin 101 when in the closed position, so that the retainer 107 can slip over the frame 104 and the closed pivot pin 101, thereby retaining the pivot pin 101 in the closed position when the retainer 107 is slid over the frame 104 and the pivot pin 101. A metal ring 102 is attached to the user end of the rope. Optionally, tubing 111 encases the loop. The distal end of the rope 105 is preferably secured to the bottom of the conventional adjuster strap.

If the retainer 107 is pushed outwardly beyond the pivot pin 101, then the metal ring 102 attached to the end of the rope slips off the pivot pin 101, thus opening the loop. FIG. 11 shows the push release loop while it is part way through the process of opening. The retainer 107 has been moved up to expose the metal pivot pin 101. The arrow 112 indicates the movement of the pivot pin 101. The arrow 110 indicates the direction of pull, or load, imparted to the hook on the spreader bar. As the pin 101 rotates in the direction shown by arrow 112, the metal ring 102 attached to the user end of the rope slips off the pivot pin 101, and the loop is opened. Optional collar 108 is a plastic piece at the distal end of retainer 107, that fits inside, or is integrally formed with, the retainer 107, and has a cylindrical depression that is complementary to the control bar. The retainer 107 and collar 108 preferably are preferably frictionally retained on the rope 105 to properly orient the loop in a plane substantially perpendicular to the plane of the hook on the spreader bar, so that it is easy to engage the hook on the spreader bar with the loop.

Figure 12:
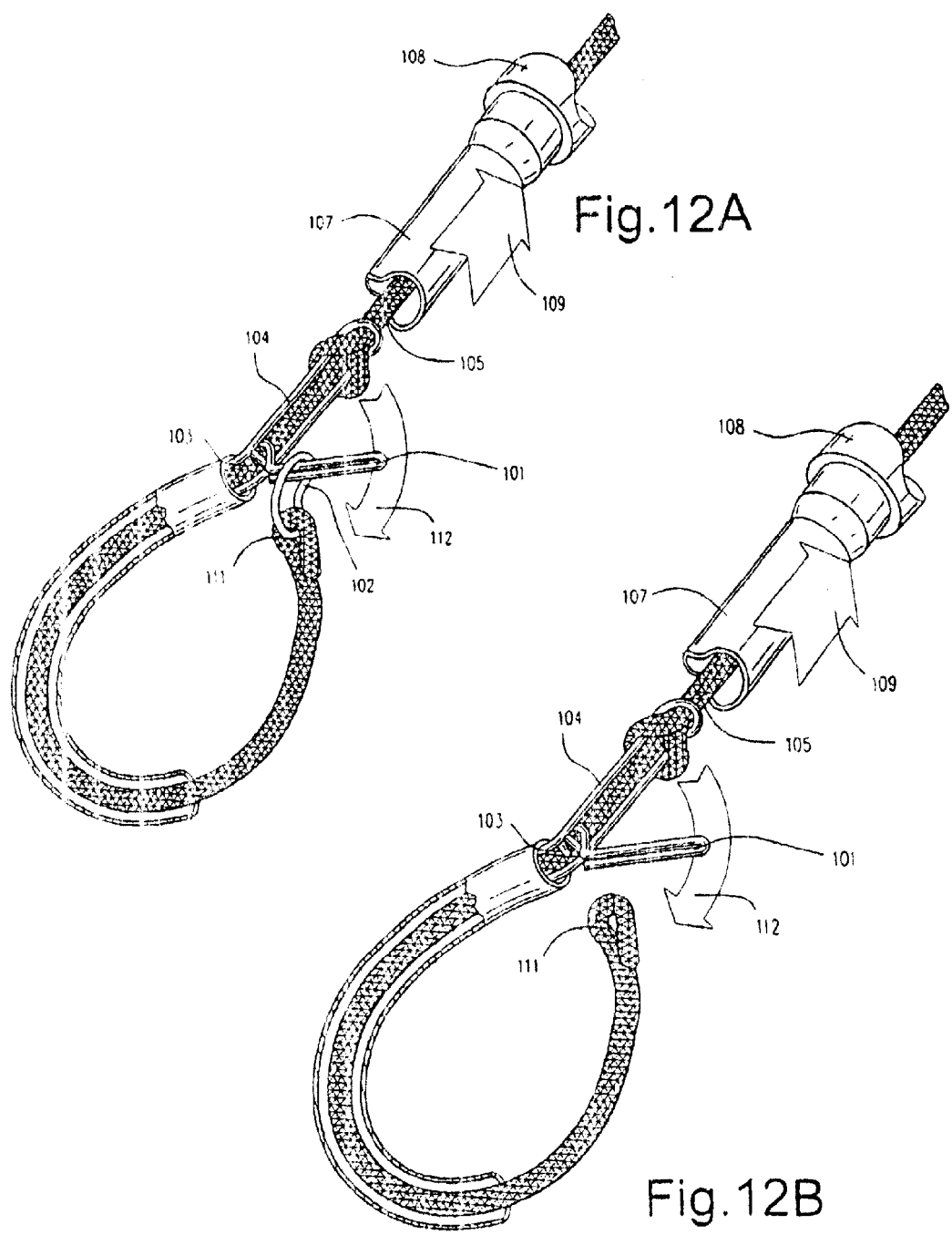
FIG. 12A is a cut-away view of the embodiment of FIG. 11.
FIG. 12B is a cut-away view of an alternative embodiment where a looplet is used instead of a ring.

FIG. 11 illustrates how the frame 104, pivot point 103, retaining pin 101, and ring 102 make the entire loop and push release mechanism one substantially rigid component when assembled. Frame 104 and ring 102 preferably each extend at one end into the tubing 111 and extend at the opposite end into the retainer 107 when the device is assembled, thus eliminating a hinge point. If a hinge point exists, then the loop tends to move around "flopping" from side to side making hooking into the spreader bar more difficult than if the entire unit remained fairly rigid FIG. 12A shows a cut away view of the loop itself. One can see the rope that is inside the protective tubing, and how this rope interacts with the metal ring on the end of the loop. This rope is the same rope that goes through the control bar and attaches to the end of the adjuster strap 59.

FIG. 12B shows a cut away view of an alternative embodiment to that shown in FIG. 12A, wherein a looplet (instead of a ring) is engagable with the pivot pin 101.

Figure 13:
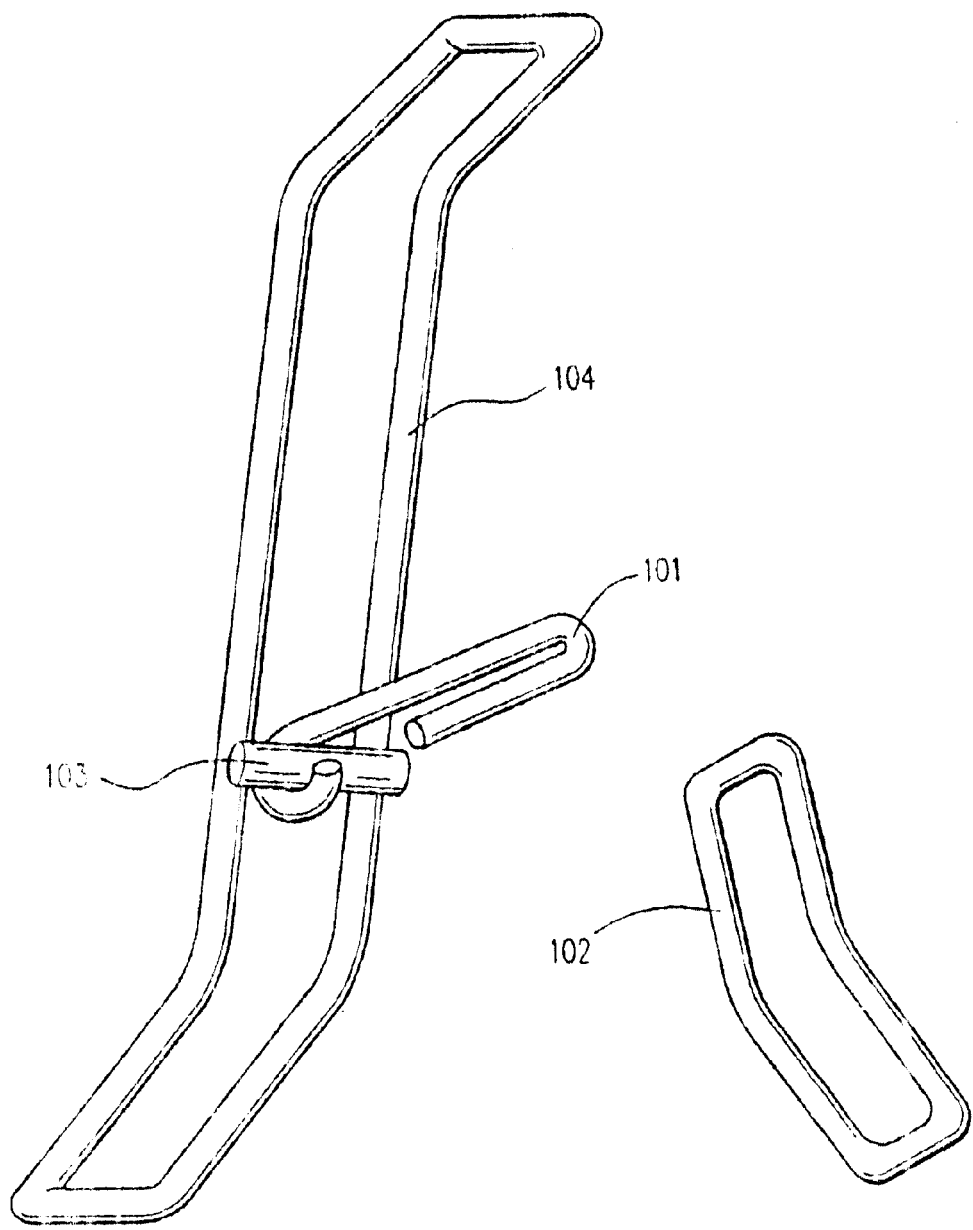
FIG. 13 is a front view of the preferably metal components of the embodiment of FIG. 11.
Figures 14A, 14B:
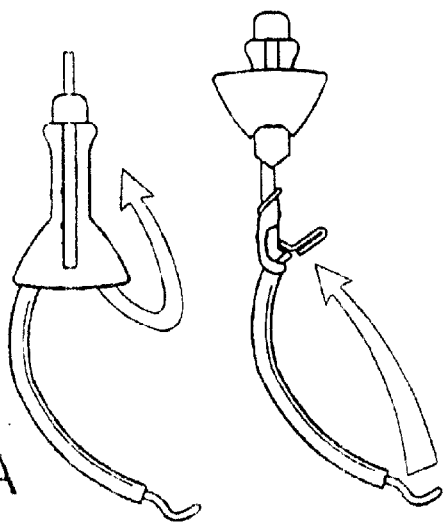
FIGS. 14A, 14B, 14C, 14D, 14E and 14F are front views of a sequence for assembling the embodiment of FIG. 11, also illustrating an optional skirt for covering the device.
Figures 14C, 14D:
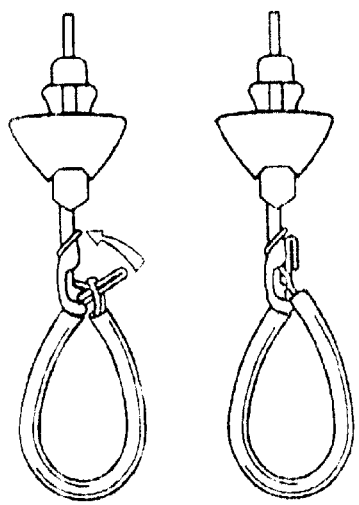
Figures 14E, 14F:
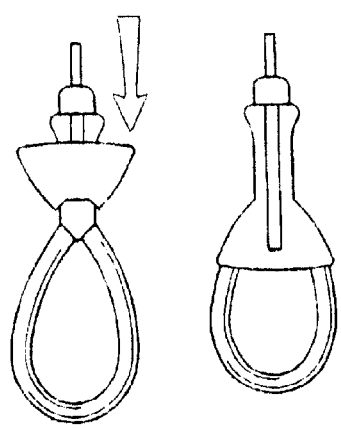

FIG. 13 shows the pivot pin 101 that pivots about the pivot point 103. The frame 104 provides rigidity for the entire mechanism by providing a rigid structure for the rope to intertwine around. The ring 102 is attached to the user end of the rope, and engaged by the pivot pin 101. It is preferred for ring 102 to be metal, so that it provides for rigidity and abrasion resistance/longevity of the product.

FIGS. 14A to 14F illustrate the six steps needed to assemble the push release loop after it has been activated. In step A, the arrow shows how to peel up the neoprene skirt. This skirt is merely an aesthetic covering of the mechanical working parts, and is an optional part. The loop will push release without the neoprene skirt.

Figure 15:
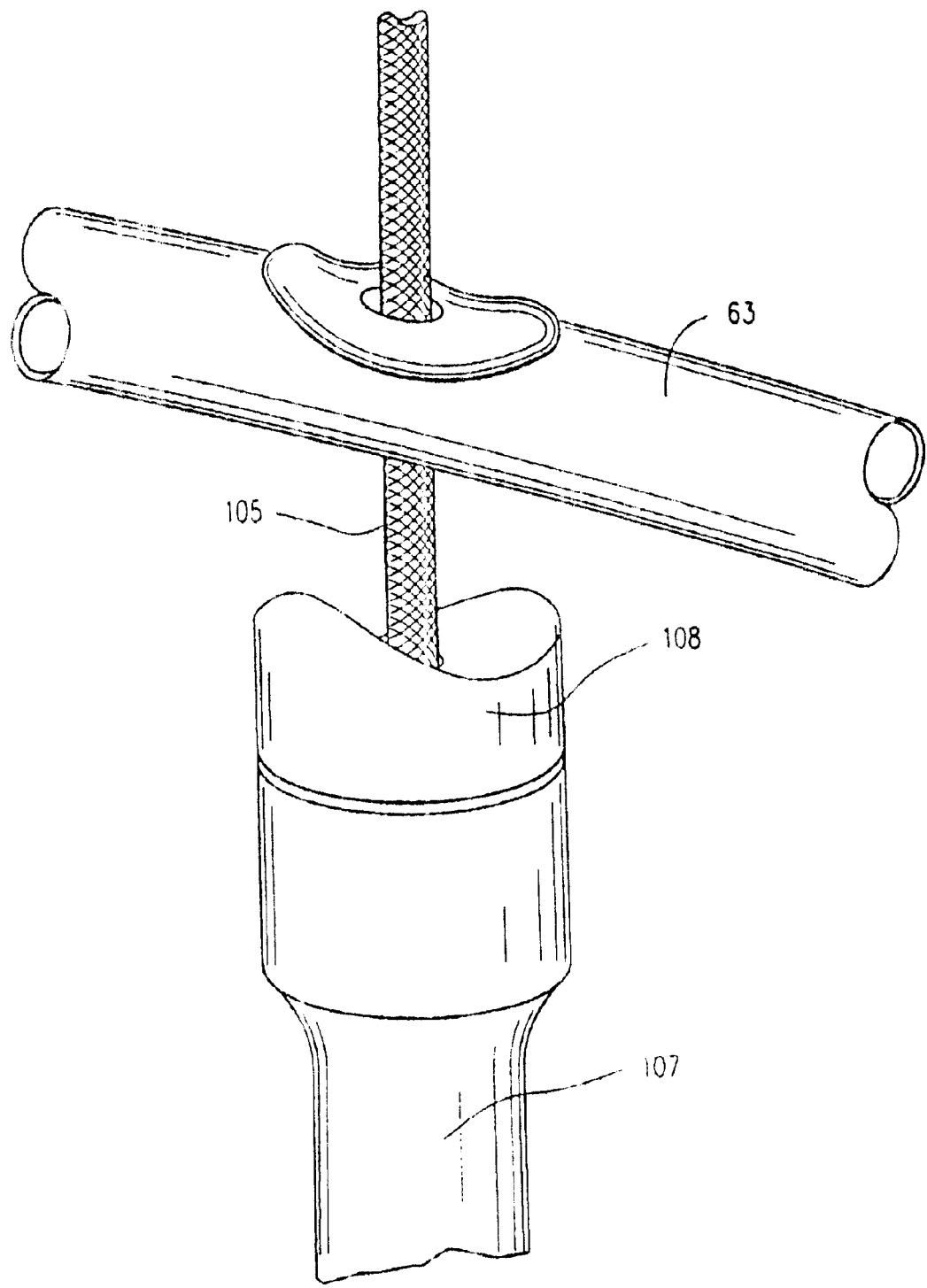
FIG. 15 is a perspective view from the front right of the embodiment of FIG. 11 where it meets the control bar.

It is very useful for the loop to automatically orient itself with respect to the user. This auto-orientation presents the loop in the ideal position so that it is easy to hook into the hook on the spreader bar. The collar 108 (preferably plastic) is shown in a close up view in FIG. 15, to illustrate how a depression in the collar 108 (that is complementary to the shape of the control bar) engages with the control bar 63 to rotationally orient the loop, preferably in a plane perpendicular to the plane of the hook on the spreader bar. The collar 108 is preferably secured to the retainer 107 by glue or integrally formed. The preferably cylindrical depression in the collar 108 engages the preferably cylindrical control bar 63 only when the loop is facing the user. If the loop were to be rotationally oriented "edgewise" to the user, it would be very hard to engage the loop into the downwardly opening hook on the spreader bar.

Figure 16A:
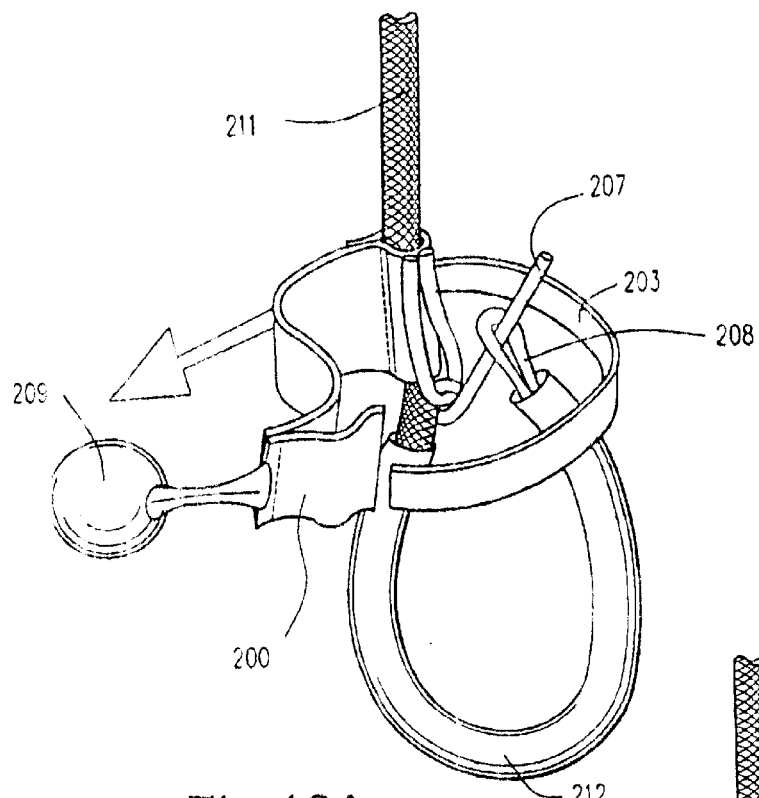
FIGS. 16A and 16B are front perspective views of a sixth type of prior art quick release loop in both assembled and partially assembled configurations.
Figure 16B:
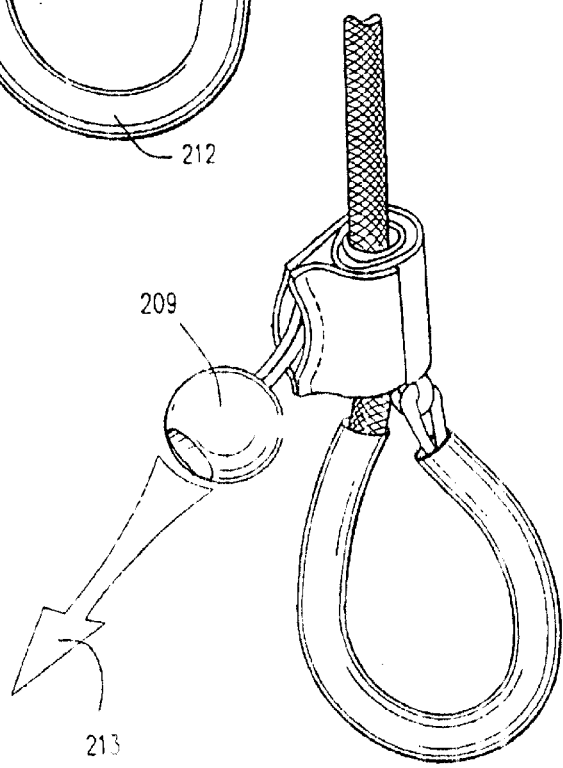

FIGS. 16A and 16B show a prior art device with a securing strap 200 that wraps around a pin 207 that holds the end of the loop 208. The securing strap is held in place by hook and loop fasteners commonly known as Velcro. The trim line 211 goes through the loop tubing 212 and has a loop 208 on the end. The special handle 209 must be located and then pulled in the direction of the arrow labeled as 213. As described previously, the added time necessary to find the special handle is undesirable, and the direction of pull is not ideal. Pulling out to the side is the most effective way to deploy this mechanism. Pulling down towards the bottom of the loop could also deploy the mechanism. This is not desirable, because of the possibility of an inadvertent release. The drawing on the right side of the page shows this concept in its assembled form.

Figure 17A:
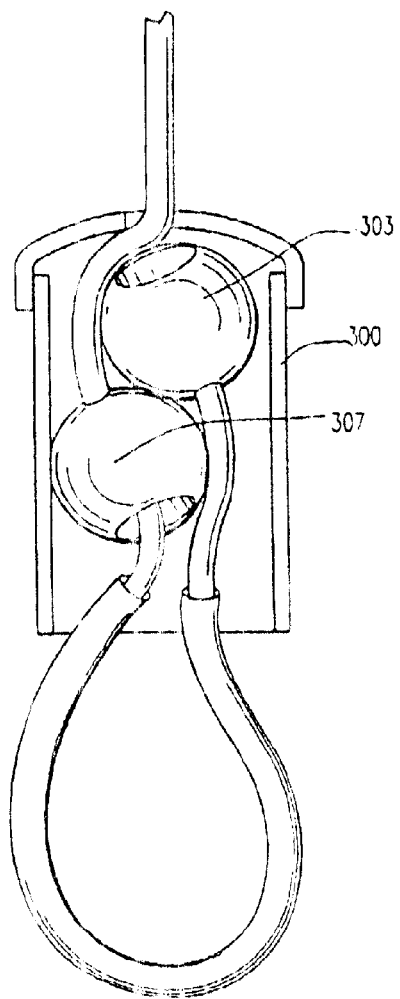
FIGS. 17A and 17B are a front cut-away views of two alternative embodiments of a push releasable loop according to the present invention.

FIG. 17A illustrates another version of a push release loop according to the invention in which a rope plug, such as a plastic ball 307, is attached to an intermediate portion of a rope. A loop plug, preferably a plastic ball 303, is attached to the end of the rope. The rope plug and loop plug are placed abutting against and overlapping each other, and a retainer 300 slidably mounted over the rope and having a cross section less than the combined cross sections of the rope plug and loop plug is slid over the plugs, which retains the plugs in abutting and overlapping position when the loop is under load. When the retainer is pushed outwardly beyond the plugs, the plastic ball 303 is able to pass by plastic ball 307, thus opening the loop.

Figure 17B:
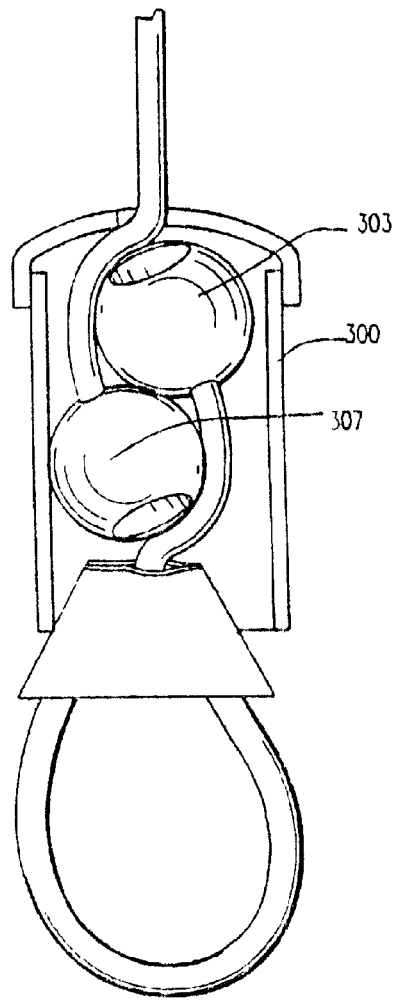

FIG. 17B illustrates still another version of a push release loop according to the present invention which has the same end result of deploying the push release loop by pushing the tubing 300 up and away from the user, but in which a separate loop is employed. A rope plug, such as a plastic ball 307, is attached to the user end of a rope. A loop plug, preferably a plastic ball 303, is attached to the end of a loop. The rope plug and loop plug are placed abutting against and overlapping each other, and a retainer 300 slidably mounted over the rope and having a cross section less than the combined cross sections of the rope plug and loop plug is slid over the plugs, which retains the plugs in abutting and overlapping position when the loop is under load. When the retainer is pushed outwardly beyond the plugs, the plastic ball 303 is able to pass by plastic ball 307, thus separating the loop from the rope.

FIGS. 18A to 18C show a variation of the concept illustrated in FIG. 17 in which the plugs have wedge shaped profiles. The part on the left is a close up view of the shape of the plug. The middle illustration is the concept in the assembled form. The illustration on the right shows how the two parts come apart when the sidewalls are removed.

Of course, the plugs can also be integrally formed with the ropes, such as knots.

While the invention has been disclosed in connection with the presently preferred embodiments described herein, it should be understood that there may be other embodiments that fall within the spirit and scope of the invention. For example, the device can be practiced using other materials or using other push releasable retainers that open up the loop. Accordingly, no limitations are to implied or inferred in this patent except as specifically and explicitly set forth in the claims.

INDUSTRIAL APPLICABILITY

This invention is applicable anywhere it is necessary to provide a loop that can be reliably, easily and ambidextrously released while under load, yet cannot be inadvertently released by being pulled in the wrong direction. For example, this invention can be used for the trapeze on catamarans (such as Hobie Cats), sail skiffs (49er Olympic sailing boats) and harnesses for sport fishing poles. Other applications include parachute, hang gliding and rock climbing harnesses, as well as harnesses for climbing poles and trees.

What is claimed is:

1. A kite device, comprising:
    a kite structure having a leading edge and a trailing edge, each edge having right and left sides;
    a canopy skin over said kite structure, whereby said kite structure and said canopy skin define an airfoil;
    a control bar having a central hole and right and left ends;
    right and left rear flying lines having kite ends and bar ends, said kite ends of said rear flying lines attached near said right and left sides of said trailing edge and said bar ends attached near said right and left ends of said control bar;
    an attachment strap having a top end and a bottom end;
    right and left front flying lines having kite ends and strap ends, said kite ends of said front flying lines attached near said right and left sides of said leading edge and said strap ends attached near said top end of said attachment strap;
    a trim line attached near the bottom end of the attachment strap and having a user end extending through the hole in the control bar and beyond the control bar;
    a retainer that retains the user end of the trim line abutting against an intermediate portion of the trim line beyond the control bar, whereby a loop is formed in the trim line;
    wherein the retainer is slidable along the trim line away from the user end;
    whereby pushing the retainer away from such user end along the trim line releases the user end of the trim line from the retainer;

whereby the user end of the trim line is no longer retained abutting against the intermediate portion of the rope, whereby the loop opens up.

2. An attachment strap device, comprising:

an attachment strap having a top end and a bottom end;

a trim line attached to the bottom end of the attachment strap and having a user end;

a retainer that retains the user end of the trim line abutting against an intermediate portion of the trim line, whereby the trim line forms a loop;

wherein the retainer is slidable along the trim line;

whereby pushing the retainer away from such user end along the trim line releases the user end of the trim line from the retainer;

whereby the user end of the trim line is no longer retained abutting against the intermediate portion of the rope, whereby the loop opens up.

3. A device for forming a push release loop in a rope, comprising:

a retainer that retains a user end of a rope abutting against an intermediate portion of the rope, whereby the rope forms a loop;

wherein the retainer is slidable along the rope;

whereby pushing the retainer away from such user end along the rope releases the user end of the rope from the retain;

whereby the user end of the rope is no longer retained abutting against the intermediate portion of the rope, whereby the loop opens up.

4. A device for push releasably forming a loop in a rope having a user end and a loop end, comprising:

a rope plug having a first cross section attached to an intermediate portion of the rope;

a loop plug having a second cross section attached to the loop end;

wherein said rope plug abuts against and overlaps said loop plug;

a retainer having an interior cross section narrower than the combined cross sections of said first cross section and said second cross section slidable along said rope and retaining said rope plug and said loop plug abutting and overlapping against each other;

whereby when said retainer is pushed along said rope away from said user end beyond said plugs, said plugs can slide past each other and said loop opens.

5. A device for push releasably retaining a loop having a loop end on a user end of a rope, comprising:

a rope plug having a first cross section attached to the user end of the rope;

a loop plug having a second cross section attached to the loop end;

wherein said rope plug abuts against and overlaps said loop plug;

a retainer having an interior cross section narrower than the combined cross sections of said first cross section and said second cross section slidable along said rope and retaining said rope plug and said loop plug abutting and overlapping against each other;

whereby when said retainer is pushed along said rope away from said user end beyond said plugs, said plugs can slide past each other and said loop separates from said rope.

6. A device, comprising:

a harness adapted to hold a user having a rope with a user end extending therefrom;

a retainer that retains the user end of the rope abutting against an intermediate portion of the rope, whereby the rope forms a loop;

wherein the retainer is slidable along the rope;

whereby pushing the retainer away from such user end along the rope releases the user end of the rope from the retainer;

whereby the user end of the rope is no longer retained abutting against the intermediate portion of the rope, whereby the loop opens up.

7. A device according to any one of claims 1, 2, 3, 4 or 5, further comprising a collar attached to a distal end of said retainer, said collar having a depression complementary to a control bar, whereby said control bar can engage said collar to rotationally orient said loop.

8. A device according to any one of claims 1 or 2, wherein said retainer comprises:

a frame having a pivot point mounted on an intermediate portion of the trim line;

a pivotable pivot pin mounted on said pivot point to pivot on said frame between an open position and a closed position adjacent to said frame;

a ring mounted on the user end of the trim line that is engageable by the pivot pin;

whereby when the ring is engaged with the pivot pin, a loop is formed in said trim line;

a hollow sleeve slidably mounted on said trim line having a larger interior cross section than said frame and said pivot pin when said pivot pin is in said closed position;

whereby the sleeve can slide over the frame and said pivot pin in said closed position engaged with the ring to maintain said pivot pin in said closed position and maintain said loop; and whereby when the sleeve is pushed away from the user end and beyond the pivot pin, the pivot pin is released and can pivot to the open position, releasing the ring and opening the loop.

9. A device according to any one of claims 1 or 2, wherein said retainer comprises:

a frame having a pivot point mounted on an intermediate portion of the trim line;

a pivotable pivot pin mounted on said pivot point to pivot on said frame between an open position and a closed position adjacent to said frame;

a looplet formed in the user end of the trim line that is engageable by the pivot pin;

whereby when the looplet is engaged with the pivot pin, a loop is formed in said trim line;

a hollow sleeve slidably mounted on said trim line having a larger interior cross section than said frame and said pivot pin when said pivot pin is in said closed position;

whereby the sleeve can slide over the frame and said pivot pin in said closed position and engage with the looplet to maintain said pivot pin in said closed position and maintain said loop; and whereby when the sleeve is pushed away from the user end and beyond the pivot pin the pivot pin is released and can pivot to the open position releasing the looplet and opening the loop.

10. A device according to any one of claims 3 to 6, wherein said retainer comprises:

a frame having a pivot point mounted on an intermediate portion of the rope;

a pivotable pivot pin mounted on said pivot point to pivot on said frame between an open position and a closed position adjacent to said frame;

a ring mounted on the user end of the rope that is engageable by the pivot pin;

whereby when the ring is engaged with the pivot pin, a loop is formed in said trim line;

a hollow sleeve slidably mounted on said trim line having a larger interior cross section than said frame and said pivot pin when said pivot pin is in said closed position;

whereby the sleeve can slide over the frame and said pivot pin in said closed position engaged with the ring to maintain said pivot pin in said closed position and maintain said loop; and whereby when the sleeve is pushed away from the user end and beyond the pivot pin, the pivot pin is released and can pivot to the open position, releasing the ring and opening the loop.

11. A device for forming a push release loop in a rope, comprising:

a frame means having a pivot point mounted on an intermediate portion of the rope;

a pivotable pivot means mounted on said pivot point to pivot on said frame between an open position and a closed position adjacent to said frame;

a ring means mounted on the user end of the rope that is engageable by the pivot pin;

whereby when the ring means is engaged with the pivot means, a loop is formed in said rope;

a hollow sleeve means slidably mounted on said rope having a larger interior cross section than said frame means and said pivot means when said pivot means is in said closed position;

whereby the sleeve means can slide over the frame means and said pivot means in said closed position engaged with the ring means to maintain said pivot means in said closed position and maintain said loop; and whereby when the sleeve means is pushed away from the user end and beyond the pivot means, the pivot means is released and can pivot to the open position, releasing the ring means and opening the loop.

12. A device for forming a push release loop in a rope, comprising:

retainer means for retaining a user end of a rope abutting against an intermediate portion of the rope, whereby the rope forms a loop;

wherein the retainer means is slidable along the rope;

whereby pushing the retainer away from such user end along the rope releases the user end of the rope from the retainer means;

whereby the user end of the rope is no longer retained abutting against the intermediate portion of the rope, whereby the loop opens up.

13. A process for using a push release loop, comprising:

attaching said push release loop to an attachment strap for a kite, whereby a user of said kite can push release said loop whenever necessary.

* * * * *

(12) EX PARTE REEXAMINATION CERTIFICATE (6427th)
United States Patent
Barrs et al.

(10) Number: US 6,988,694 C1
(45) Certificate Issued: Sep. 9, 2008

(54) PUSH RELEASE LOOP

(75) Inventors: Christopher Carswell Barrs, Haiku, HI (US); Donald Lewis Montague, Haiku, HI (US); Alexander Pouchkarev, San Anselmo, CA (US)

(73) Assignee: Nalu Kai Incorporated, Haiku, HI (US)

Reexamination Request:
No. 90/008,157, Aug. 10, 2006

Reexamination Certificate for:
Patent No.: 6,988,694
Issued: Jan. 24, 2006
Appl. No.: 10/432,466
Filed: May 14, 2003

(22) PCT Filed: May 14, 2003
(86) PCT No.: PCT/US03/15433
§ 371 (c)(1),
(2), (4) Date: May 4, 2003
(87) PCT Pub. No.: WO03/095033
PCT Pub. Date: Nov. 20, 2003

Related U.S. Application Data
(60) Provisional application No. 60/380,777, filed on May 14, 2002.

(51) Int. Cl.
*B64C 31/06* (2006.01)

(52) U.S. Cl. .................................. 244/155 A; 114/39.18
(58) Field of Classification Search ........................ None
See application file for complete search history.

(56) References Cited

U.S. PATENT DOCUMENTS

| 3,467,046 | A  | 9/1969  | Welton          |
|-----------|----|---------|-----------------|
| 3,540,083 | A  | 11/1970 | O'Connor        |
| 6,581,879 | B2 | 6/2003  | Bellacera       |
| 6,691,954 | B1 | 2/2004  | Harrington et al. |
| 6,830,220 | B2 | 12/2004 | Runyan          |
| 6,869,047 | B2 | 3/2005  | Pouchkarev      |

OTHER PUBLICATIONS

U.S. Appl. No. 60/394,364, filed Jul. 3, 2002, Pouchkarev–37CFR 1.47(b) Decision, etc..
"Kiteboard" magazine, vol. 2, issue 2, No. 3, Autumn 2001, pp. 5, 12 and 53.
Nalu Kai, Incorporated, 2002 Importer Meeting manual, cover, agenda, p. 8, distributed Jul. 9, 2001.
Nalu Kai, Incorporated, "Naish ARX Kite User's Guide", pp. 3, 4 and 6 (copyright 2000, per p. 12).
U.S. Appl. No. 60/380,777, filed May 14, 2002, Barrs et al..
U.S. Appl. No. 60/334,926, filed Dec. 4, 2001, Harrington et al..

*Primary Examiner*—Joseph A. Kaufman

(57) ABSTRACT

The invention is a device that push releasably retains one end of a rope (111) abutting against an intermediate part of the rope (103) to form a push releasable loop.

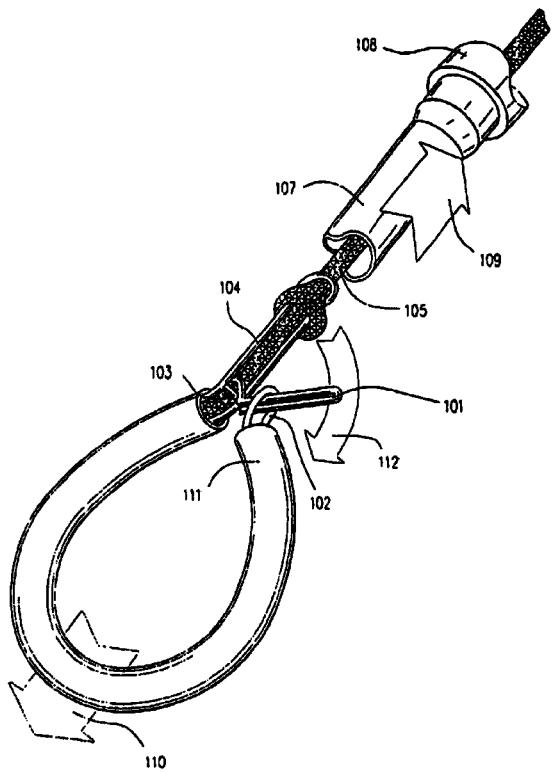

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 6, 8, 9 and 13 is confirmed.

Claim 3 is cancelled.

Claim 10 is determined to be patentable as amended.

New claim 14 is added and determined to be patentable.

Claims 4, 5, 7, 11 and 12 were not reexamined.

10. A device according to any one of claims [3] *4* to 6, wherein said retainer comprises:
- a frame having a pivot point mounted on an intermediate portion of the rope;
- a pivotable pivot pin mounted on said pivot point to pivot on said frame between an open position and a closed position adjacent to said frame;
- a ring mounted on the user end of the rope that is engageable by the pivot pin;
- whereby when the ring is engaged with the pivot pin, a loop is formed in said [trim line] *rope*;
- a hollow sleeve slidably mounted on said [trim line] *rope* having a larger interior cross section than said frame and said pivot pin when said pivot pin is in said closed position;
- whereby the sleeve can slide over the frame and said pivot pin in said closed position engaged with the ring to maintain said pivot pin in said closed position and maintain said loop; and
- whereby when the sleeve is pushed away from the user end and beyond the pivot pin, the pivot pin is released and can pivot to the open position, releasing the ring and opening the loop.

*14. A device for forming a push release loop in a rope, comprising:*
- *a retainer that retains a user end of a rope abutting against an intermediate portion of the rope, whereby the rope forms a loop;*
- *wherein the retainer is slidable along the rope;*
- *whereby pushing the retainer away from such user end along the rope releases the user end of the rope from the retainer;*
- *whereby the user end of the rope is no longer retained abutting against the intermediate portion of the rope, whereby the loop opens up;*
- *wherein said retainer comprises:*
- *a frame having a pivot point mounted on an intermediate portion of the rope;*
- *a pivotable pivot pin mounted on said pivot point to pivot on said frame between an open position and a closed position adjacent to said frame;*
- *a ring mounted on the user end of the rope that is engageable by the pivot pin;*
- *whereby when the ring is engaged with the pivot pin, a loop is formed in said rope;*
- *a hollow sleeve slidably mounted on said rope having a larger interior cross section than said frame and said pivot pin when said pivot pin is in said closed position;*
- *whereby the sleeve can slide over the frame and said pivot pin in said closed position engaged with the ring to maintain said pivot pin in said closed position and maintain said loop; and*
- *whereby when the sleeve is pushed away from the user end and beyond the pivot pin, the pivot pin is released and can pivot to the open position, releasing the ring and opening the loop.*

\* \* \* \* \*